Sept. 18, 1962

D. C. BUSCALL, JR 3,054,574

AERIAL WIRE DISPENSER

Filed Aug. 25, 1960

*INVENTOR,*
DAVID C. BUSCALL JR.
BY
*Harry M. Saragovitz*
ATTORNEY.

Sept. 18, 1962    D. C. BUSCALL, JR    3,054,574
AERIAL WIRE DISPENSER

Filed Aug. 25, 1960    3 Sheets-Sheet 2

INVENTOR,
DAVID C. BUSCALL JR.
BY
*Harry M. Saragovitz*
ATTORNEY.

Sept. 18, 1962  D. C. BUSCALL, JR  3,054,574
AERIAL WIRE DISPENSER
Filed Aug. 25, 1960  3 Sheets-Sheet 3
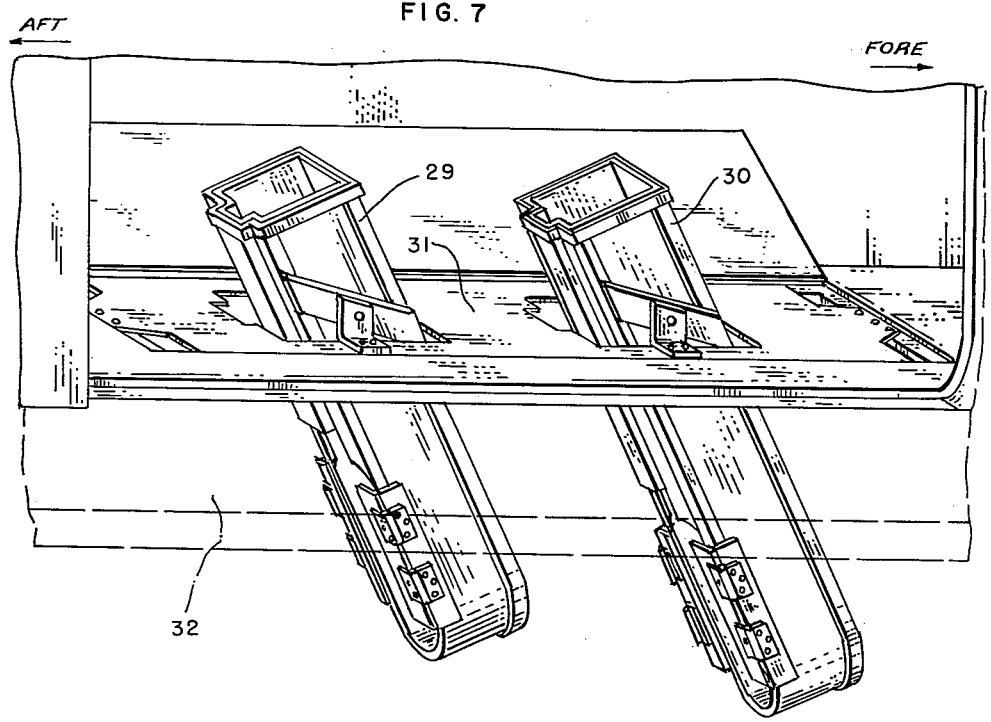
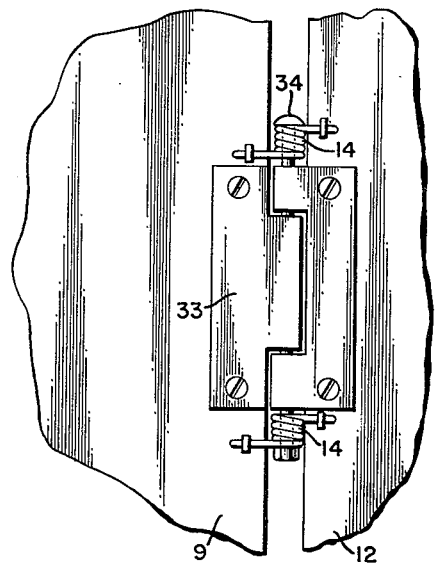
INVENTOR.
DAVID C. BUSCALL JR.
BY
*Harry M. Saragovitz*
ATTORNEY.

United States Patent Office 3,054,574
Patented Sept. 18, 1962

3,054,574
AERIAL WIRE DISPENSER
David C. Buscall, Jr., Sierra Vista, Ariz., assignor to the United States of America as represented by the Secretary of the Army
Filed Aug. 25, 1960, Ser. No. 52,000
4 Claims. (Cl. 242—129)
(Granted under Title 35, U.S. Code (1952), sec. 266)

The invention described herein may be manufactured and used by or for the Government of the United States of America for governmental purposes without the payment of any royalties thereon or therefor.

The present invention relates generally to wire laying devices, and particularly to wire laying devices adapted for paying out wire at relatively high rates from airborne vehicles.

Despite progress in radio communications, metallic circuits will continue, in the foreseeable future, to play a vital role in field communications of the military services. Metallic circuits provide communications with a resistance to interception or to interruption (by extreme environmental conditions, by enemy electronic countermeasures, or by interference from heavy friendly traffic) that radio circuits in many instances cannot provide. Often, needed wire or cable circuits can be satisfactorily laid by surface means, but many requirements for laying wire and cable (for example, in a minimum of time or over adverse terrain) can be satisfactorily met only by the laying of the circuits by aircraft. In the past, the use of aircraft in laying of wire or cable was limited to special isolated instances, mainly where difficult or inaccessible terrain prevented installation by other means. Since such cases were infrequent, little thought or study was given to aerial wire on a larger scale. The necessary high mobility and frequency of movement of modern military units puts tremendous new importance upon the aerial laying of wire and cable.

Although the dispenser described herein may be used with fixed-wing aircraft, it is particularly adapted for use with helicopters. The fixed-wing aircraft has been found to be inferior to helicopters as carriers of aerial wire dispensers for several reasons: the incidence of snarls is increased at the higher speeds required for safety in fixed winged aircraft; the ground track of the wire cannot be controlled as well at the higher required speeds; the fixed wing aircraft cannot land to repair a break or to police the line; prior reconnaissance is easier with helicopters; helicopters can be flown at low speeds frequently required for aerial dispensing, for accurate control of ground track and for continuous in-flight reloading. Further, the helicopter's maneuverability permits selection, by prior reconnaissance, of an optimum route for laying the wire.

The dispensing device in accordance with the present invention provides the following features: adapted to be readily installed on a variety of aircraft including helicopters; is capable of laying at least two lines simultaneously; may be reloaded in flight so that any length of line or lines can be laid limited only by the capacity of the aircraft; capable of paying out successive coils of wire; and the coils comprising the wire to be laid are gravity fed.

The invention will be described particularly in connection with the laying of wire from helicopters by way of illustration of a preferred embodiment thereof, although it will be understood that the invention is not necessarily so limited but is adapted for use in connection with other types of rapid moving vehicles, both land and water, susceptible to rapid movement and maneuvering.

It is accordingly a principal object of the present invention to provide a wire-laying apparatus adapted for the paying out of wire at relatively high rates.

Another object of the invention is to provide a wire laying apparatus for holding a plurality of coils of wire or the like and to allow the seriatim laying thereof.

It is a further object of the invention to provide wire laying apparatus which may be used for laying wire (from one or a plurality of coils) from aircraft and without damage to the wire.

Still another object of the invention is to provide a wire laying apparatus which is particularly suited for the paying out of wire or the like from helicopters.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 2a is a detail showing a spring-loading means used in the practice of the invention;

FIGURE 7 depicts the installation of a modification of wire-laying apparatus in accordance with this invention in the trap-door opening of a military type aircraft.

Figure 1:
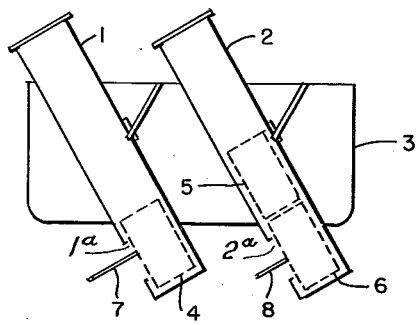
FIGURE 1 is an elevational view of the wire-laying apparatus embodying the present invention.

In accordance with one embodiment of the invention as shown in FIGURE 1, there are provided two dispensing tubes or magazines, 1 and 2, mounted on a vehicle 3, at an angle as illustrated. Coil packages 4, 5 and 6 are shown in dotted lines. Coils 4 and 6 are in disepensing position with wires 7 and 8 being payed out. It should be noted that the wires 7 and 8 while paying out, do not come in contact with the tube or magazine elements 1 and 2. Dispensing tubes 1 and 2 are constructed to have a substantially rectangular cross section as shown in somewhat greater detail in FIGURE 2.

The tubes 1 and 2 are open at the top and rounded off at the bottom portions. Openings 1a and 2a are provided for paying out the wire coils 4 and 6 shown in the pay-out position. Openings 1a and 2a in this embodiment of the invention are made somewhat smaller in diameter than the diameter of the coils. For coils having a diameter of 14 inches the openings were made 12 inches in diameter. A coil particularly adapted for this purpose is encased in a canvas bag or jacket and has a military designation of MX 306A/G. A detailed description of the coil is provided in connection with a discussion of FIGURE 5. When the last few turns of wire are payed out the canvas bag collapses and is ejected through the openings. The arrangement shown in FIGURE 1 allows for easy loading during movement, holds the coils in the best attitude for high-speed payout, and is readily adapted for mounting on a variety of vehicles. Where believed desirable one of the tubes may be made somewhat longer than the other to further reduce the probability of snarls.

Figure 2:
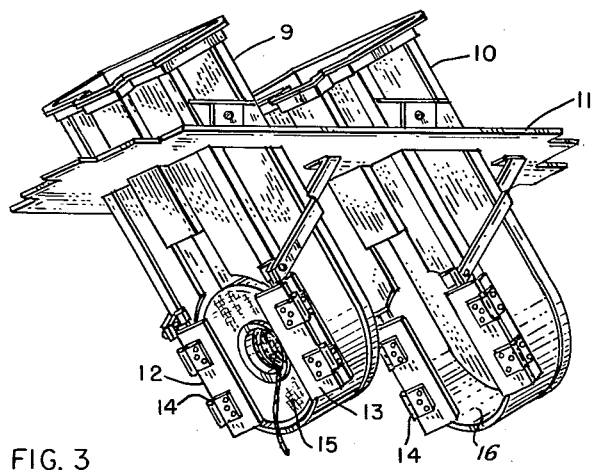
FIGURE 2 is a detailed perspective showing of the wire laying apparatus in accordance with the present invention.

In the embodiment of the invention illustrated by FIGURE 2, the tubes 9 and 10 are mounted on a heavy aluminum plate 11 which plate is adapted to replace the trap door in certain types of military helicopters. Although the embodiment of FIGURE 1 was very satisfactory under all normal conditions it was ascertained that in very cold weather the canvas containers used to house the coil of wire would become stiff and not collapse sufficiently to become ejected through the openings 1a and 2a. This problem was ingeniously solved by providing a larger opening 16 at the lower sides of the tubes and placing spring-loaded partial doors 12 and 13 along the edge of the payout openings to hold the coil in place during payout and at the time of complete payout to permit the canvas bag of coil 15 to be ejected and allow the second coil to fall into payout position.

An important feature of the spring-loaded doors relates to the continuance of wire payout, and to the safety of the aircraft, in the event that a snarl does develop within the coil during payout. Such snarls may sometimes occur because of defect in manufacture, inattention on the part of personnel when preparing coils for payout, or for other reasons. A snarl developing in a coil during payout produces a tension on the wire which exceeds that of the spring-loaded doors and thereby causes the partially-dispensed coil to be ejected along with its canvas jacket allowing the next coil to drop into payout position for the continuance, without interruption, of the circuit being laid. The effect upon the control of the aircraft due to the ejection of the defective coil is negligible and not appreciably different from that occurring during the ejection of the canvas bag at the completion of the payout of a non-defective coil.

Springs 14 are adjusted, in the embodiment tested, to an aggregate tension of approximately 35 pounds which allowed the doors 12 and 13 to support the weight of the coil 15 with sufficient tolerance. FIGURE 2a is a detail of a spring loading arrangement which may be employed to provide the coil-retaining force to the doors. Door 12 is mounted to tube 9 by means of hinge 33. Spring means 14 are provided as shown, one at each end of pin 34. It will be understood that various arrangements other than that shown may be used. For example, spring 14 may be centrally located with respect to hinge 33. The lower portions of the tubes 9 and 10 are shown rounded off to accommodate the shape of the coil package 15.

Figure 5:
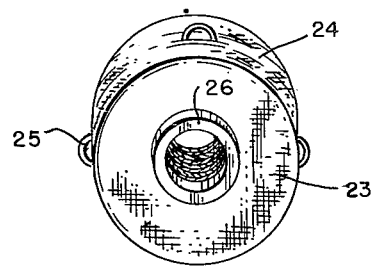
FIGURE 5 is a detailed showing of a preferred form of wire-dispensing coil package for use with the present invention.

A field wire dispensing package having military nomenclature of MX 306A/G Field Wire Dispenser provided a convenient half-mile package of WD-1/TT field wire, twisted-pair, solenoid-wound, weighing approximately 25 pounds. This dispenser, illustrated in FIGURE 5, is encased in a canvas jacket 24 and has an axial hole four inches in diameter on each side dispensing the wire. The turns of wire in the coil are held in place by an adhesive, which also serves as a restraining agent to keep the wire from paying out too freely. The axial holes in the canvas jacket 23 are bushed with rubber grommets 26 and the canvas container is equipped with three D rings 25 centered on the outside perimeter. The package measures approximately 14 inches in diameter and is six inches thick. The MX 306A/G container, and variation thereof, provide a standard package which may be used to pay out wire under a wide variety of conditions. The grommet 26 provides a convenient payout guide for the wire. It may be air-dropped for delivery to troops in the field; it permits laying of wire by ski troops using a shoulder sling; it may be paid out from land vehicles and amphibious vehicles, and from helicopter and liaison type aircraft.

It was found that a non-rotating, self-supporting coil, such as the above-described MX 306A/G field wire container, and illustrated in FIGURE 5, had many advantages over the rotating coil types which were used in many prior wire-laying systems; there were no moving parts; the separate coils could be prespliced to other similar coils before being laid; and resulted in simpler and lighter-weight equipment for dispensing.

Figure 3:
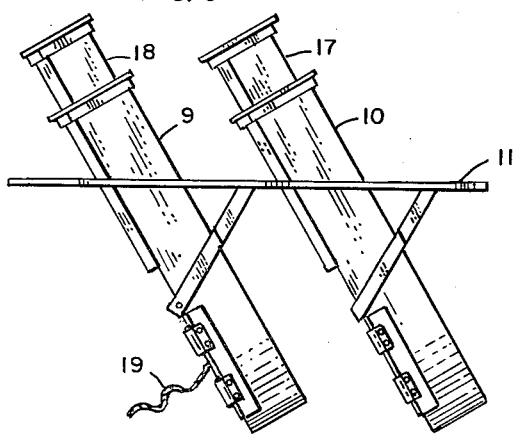
FIGURE 3 is an elevational view of a further embodiment of the invention.

The dispensing apparatus illustrated in FIGURE 3 is similar to that shown in FIGURE 2 with the additional feature of the extension tubes 17 and 18 telescopically positioned within the main tubes 9 and 10 respectively. The use of the extensions 17 and 18 allows for a fixed load of up to five MX 306 coils to be carried. In the arrangement depicted by FIGURE 3 the extensions may be "telescoped" into the main tubes when not in use.

FIGURE 7 shows a partial view of a military type helicopter 32 equipped with a pair of dispensing tubes 29 and 30, positioned in a mounting plate 31, and installed in the trap-door opening of the aircraft. In this installation tube 30 is somewhat longer at its bottom end than tube 29. The lengthening of the leading or fore tube, as illustrated, permits the payout of wire at higher speeds without the danger of having the wire from the fore tube 30 coming in contact with aft tube 29 or the wire being dispensed therefrom. This arrangement also permits a closer spacing between tubes.

Figure 4:
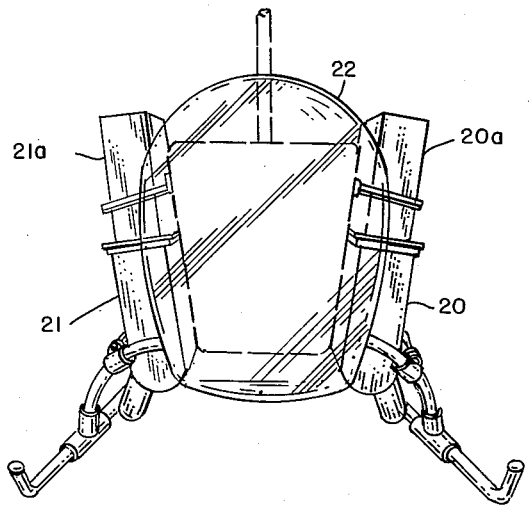
FIGURE 4 is a fragmentary front elevational view of a helicopter utilizing an embodiment of the wire laying apparatus in accordance with the present invention.

On certain types of helicopters it is not feasible to utilize the "trap door" type of mounting of the tubes, thus requiring that the tubes be mounted somewhat as illustrated in FIGURE 4. Tubes 20 and 21, together with their respective extensions 20a and 21a, are shown mounted to the sides of the helicopter fusilage 22. In other situations a still further mounting variation may be more suitable. In the case of aircraft not equipped with trap doors, the dispenser may be mounted as a balcony out of the cargo door.

Figure 6:
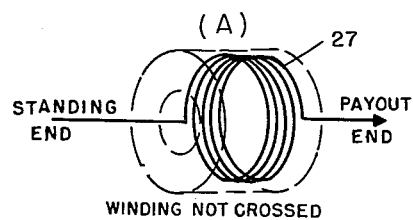
FIGURE 6 illustrates the last few turns of the windings of a coil of wire, and will be used in connection with description of the coil package of FIGURE 5.
Figure 6:
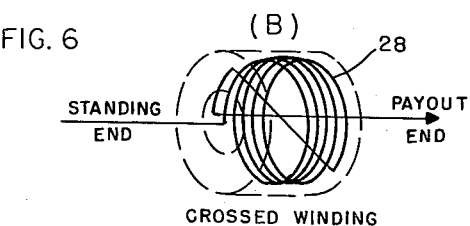

It is important that the coils used be wound in a manner to avoid having the last or outside layer of wire ending on the payout side of the coil, instead of the standing end side. This results in the standing end of the wire making a course turn over the last or outer layer to exit the package on the standing end side as shown in FIGURE 6B. FIGURE 6A shows a coil properly wound where the winding is not crossed.

Ordinarily the "basic load" in the dispensing magazine will be two coils. The initiation of the payout may be accomplished either by fixing the payout end, or ends in the case of plural tubes, to a ground object, or in flight by throwing a weight out of the aircraft over the initial point with the wire attached. In the embodiment herein described a weight of about four pounds is sufficient. The end of the payout wire is normally secured to the mouth of the dispenser with a small piece of masking tape to prevent the air drag or weight of the wire from prematurely initiating the payout. After the initiation of payout, the wire will uncoil itself and dispense from the first coil package in each tube, when the first coil payout has been completed the empty canvas bag is ejected and remains on the line being payed out. The second package then drops by gravity into the payout position and continues dispensing without interruption. Additional coils may be spliced to those in the tubes and loaded as required.

In operation the wire laying device herein described provides a solution to any air-laying problem heretofore never successfully solved. With the exception of the situation depicted by FIGURE 4 the device is used on a reloadable-in-flight basis, i.e.: the tubes or ducts are furnished with a basic load of two coils of wire, preconnected, in each tube; additional wire required for flight is stored on the floor of the aircraft in a location for easy loading into the tube or ducts as required. Usually all the coils of field wire are prepared and prespliced for air-laying prior to flight of the aircraft. As previously indicated, the payout of wire may be initiated by two methods, first by fastening the payout end(s) of the first coil(s) to a static object on the ground prior to take-off, in which case payout will begin when the aircraft takes off, second, by initiation of payout in flight when the aircraft flies over the initial point by pulling sufficient wire from the payout end(s) of the first coil(s) to reach into the cargo compartment of the aircraft and then attaching a suitable weight (approximately four pounds in embodiments described) to the end(s) of wire and throwing weight with wire attached out of the aircraft at the desired point. This latter method may also be accomplished by having all of the coils stacked on the floor of the aircraft (none in the tubes or ducts) and dropping the weight (with payout end of first coil attached) through the opening in the tube(s) when flying over the initial point, and immediately sliding the first coil into payout position in the tube followed by the insertion of the second coil.

After the initiation of payout, the wire will uncoil itself and dispense from the first coil in each dispenser tube. When the first coil has dispensed all of its wire, the empty canvas container is ejected and remains on the line(s) being payed out. The second coil then drops, by gravity, into the payout position and continues the dispensing without interruption. A crew member will then reload another coil into the tube. This cycle continues until the line(s) are laid to the target.

It is to be understood, of course, that the foregoing disclosure relates only to preferred embodiments of the invention and that numerous modifications or alterations may be made therein without departing from the spirit and scope of the invention as set forth in the appended claims.

What is claimed is:

1. A wire dispensing means for paying out wire from at least two separate coils simultaneously comprising: a mounting plate including two openings of rectangular dimensions; a wire dispensing magazine of rectangular cross section positioned in each of said openings and extending therethrough, bracket means for holding said magazine at an angle with respect to said plate, said magazine having an opening at one end to receive coils of wire and a closed portion at the other end for holding a coil of wire while in its payout position; said magazine having a payout opening in one of the side walls in the region of said other end, said opening having a diameter at least equal to that of a coil of wire and means mounted along the edge of said opening providing a retaining force on a coil of wire during the payout of wire and to permit said coil to be ejected when the pull of the wire exceeds said retaining force.

2. A wire dispensing means comprising a first elongated hollow member of rectangular cross-section open at one end and closed at the other end, a second elongated hollow member open at both ends and of rectangular cross section, said second member adapted for a telescopic fit into said open end of said first member to provide an extension therefor, said first and second member cross sections adapted to accommodate a coil of wire, an opening in one of the walls of said first member in the region of said closed end, said opening having its center aligned with the axis of a coil of wire in its payout position, and means mounted along the edges of said opening to provide a retaining force on said coil during the paying out of wire from said coil.

3. A wire dispensing means comprising a mounting plate adapted to replace the trap door in a helicopter, a pair of openings in said plate, hollow elongated magazine members of rectangular cross section positioned in said openings, bracket means for holding said members at an angle of incline of approximately sixty degrees with respect to said plate, said openings being one behind the other along a center line on said plate, each of said members having an opening portion at one end and a closed portion at the other end, a payout opening in the side wall of said members in the region of said closed position, and coil-retaining means mounted along the edges of said last-named openings, said payout openings in each member facing in substantially the same direction.

4. A wire dispensing means for use in conjunction with a helicopter comprising a mounting plate for installation in a trap-door opening of a helicopter, said plate having a first and second mounting opening in spaced relation along one of the centerlines of said plate, a first and second tubular member of rectangular cross-section positioned within said opening to extend above and below said plate, a mounting bracket means for holding said members at an angle with respect to said plate, said members having an open portion for the feeding of coils of wire thereinto and a closed portion formed to accommodate a coil of wire while in its payout position, payout openings formed in corresponding walls of each of said members in the region of said closed portion, said payout openings having a diameter at least equal to the diameter of a coil of wire, and coil-retaining means including spring loading means mounted along the edge of said payout opening, said payout openings being below said plate and facing in substantially the aft direction when the center line of said plate is positioned along the fore-aft axis of the helicopter fuselage.

References Cited in the file of this patent

UNITED STATES PATENTS

| | | |
|---|---|---|
| 2,135,736 | Stewart | Nov. 8, 1938 |
| 2,403,277 | Hall | July 2, 1946 |
| 2,477,059 | Hill | July 26, 1949 |
| 2,985,404 | Tashiro | May 23, 1961 |